United States Patent
Yokomizo et al.

(10) Patent No.: US 7,344,673 B2
(45) Date of Patent: Mar. 18, 2008

(54) MULTI-LAYER PRELIMINARY FORMED BODY AND METHOD OF MANUFACTURING THE FORMED BODY

(75) Inventors: Hodaka Yokomizo, Chiba (JP); Jitsuo Oda, Chiba (JP); Yasuhiko Takeuchi, Nagano (JP); Hiromitsu Miyajima, Nagano (JP)

(73) Assignees: Teijin Limited, Osaka (JP); Nissei Plastic Industrial Co., Ltd., Nagano (JP)

( * ) Notice: Subject to any disclaimer, the term of this patent is extended or adjusted under 35 U.S.C. 154(b) by 977 days.

(21) Appl. No.: 10/399,709

(22) PCT Filed: Oct. 17, 2001

(86) PCT No.: PCT/JP01/09106

§ 371 (c)(1),
(2), (4) Date: Apr. 21, 2003

(87) PCT Pub. No.: WO02/32650

PCT Pub. Date: Apr. 25, 2002

(65) Prior Publication Data

US 2004/0022975 A1 Feb. 5, 2004

(30) Foreign Application Priority Data

Oct. 19, 2000 (JP) .............................. 2000-318979

(51) Int. Cl.
*B29C 49/06* (2006.01)
*B29C 49/22* (2006.01)

(52) U.S. Cl. .............. 264/513; 264/328.1; 264/328.17; 264/917; 264/921

(58) Field of Classification Search ................ 264/513, 264/917, 921, 328.1, 328
See application file for complete search history.

(56) References Cited

U.S. PATENT DOCUMENTS

| 4,526,821 | A | * | 7/1985 | McHenry et al. | ........ 206/524.6 |
|---|---|---|---|---|---|
| 4,990,301 | A | * | 2/1991 | Krishnakumar et al. | .... 264/513 |
| 5,443,378 | A | * | 8/1995 | Jaroschek et al. | .......... 425/130 |
| 5,804,016 | A | * | 9/1998 | Schmidt et al. | ............. 156/242 |

FOREIGN PATENT DOCUMENTS

| EP | 0 887 170 A1 | 12/1998 |
|---|---|---|
| JP | 61-258751 A | 11/1986 |

(Continued)

OTHER PUBLICATIONS

Bichler M et al: "Multilayer-Preforms" Kunststoffe, Carl Hanser Verlag, Munchen, DE, vol. 87, No. 10, Oct. 1997, p. 1290,1292,1294.

*Primary Examiner*—Suzanne E. McDowell
(74) *Attorney, Agent, or Firm*—Sughrue Mion, PLLC

(57) ABSTRACT

A preform for a multi-layered hollow vessel has excellent moldability and productivity and is free from the deterioration of the characteristic properties of the vessel even when a recycled material is filled in large quantities. A molded product is produced by filling a first material and a second material into the cavity of an injection mold in a single molding step including (i) the substep of injecting the first material, (ii) the substep of injecting the first material and the second material at the same time and (iii) the substep of injecting the first material which are carried out continuously in this order.

5 Claims, 3 Drawing Sheets

FOREIGN PATENT DOCUMENTS

| | | |
|---|---|---|
| JP | 63-252705 A | 10/1988 |
| JP | 2-32813 A | 2/1990 |
| JP | 2-95631 U | 7/1990 |
| JP | 2-258310 A | 10/1990 |
| JP | 3-114707 A | 5/1991 |
| JP | 7-178801 A | 7/1995 |

\* cited by examiner

MULTI-LAYER PRELIMINARY FORMED BODY AND METHOD OF MANUFACTURING THE FORMED BODY

FIELD OF THE INVENTION

The present invention relates to a bottomed preform for a multi-layered blow molded hollow vessel and to a production process therefor. More specifically, it relates to a bottomed preform for a multi-layered hollow vessel, which is mainly made from polyethylene terephthalate or polyethylene naphthalate, is multi-layered using a recycled resin material, and has excellent recylability and physical properties and to a production process therefor.

DESCRIPTION OF THE PRIOR ART

There are widely known processes for obtaining multi-layered molded articles from different types of resin materials by a single injection molding step, such as two-color molding and sandwich molding. As for blow molded hollow vessels, multi-layered preforms produced by using a gas barrier resin material as an intermediate material have already been commercialized.

The above multi-layered preforms are generally produced by an injection molding process called "sandwich molding process" in which after the injection of a first material, a second material is injected to produce a three-layer structure consisting of two surface layers made from the first material and an intermediate layer made from the second material. However, in the conventional sandwich molding process, the preform for a hollow vessel has a problem that the thickness of the intermediate layer made from the second material increases and the thickness of the surface layer made from the first material decreases in the bottom portion because a gate port is generally formed in the bottom portion to fill resins. Therefore, when the mechanical strength of the second material is low, problems occur such as a reduction in the strength of the bottom portion of the hollow vessel and boosted cost when the second material is expensive.

Meanwhile, progress has recently been made in recycling system for polyethylene terephthalate bottles, and recycling of PET for bottles is now considered. Then, studies on the production of multi-layered bottles from recycled materials are now under way but it is difficult to re-use recycled materials in bottles because they have low strength. JP-A 2-258310 and JP-A 7-178801 (the term "JP-A" as used herein means an "unexamined published Japanese patent application") disclose technology for forming a five-layer structure comprising a core layer made from a first material in the bottom portion by adjusting the timing of filling the first material and a second material. Since this technology aims to cut production cost by reducing the amount of the expensive second resin material, the amount of the second material must be controlled to improve mechanical strength.

When the above technology is used, the amount of a recycled material must be greatly reduced to prevent a reduction in strength, particularly impact strength at the time of falling even when the recycled material is used. Therefore, it cannot be said that this technology is suitable in providing a preform having excellent recyclability.

SUMMARY OF THE INVENTION

It is an object of the present invention to provide a preform for a multi-layered hollow vessel.

It is another object of the present invention to provide a preform for a multi-layered hollow vessel having excellent moldability and productivity and free from the deterioration of the characteristic properties of a vessel even when a large amount of a recycled material is used.

It is still another object of the present invention to provide a production process for optimizing the multi-layer structure of a multi-layered preform, that is, optimizing the thickness distribution of a second material which is inferior in mechanical strength and realizing the optimum thickness distribution.

Other objects and advantages of the present invention will become apparent from the following description.

According to the present invention, firstly, the above objects and advantages of the present invention are attained by a bottomed preform for a blow molded hollow vessel having a multi-layer structure, wherein the bottom portion and barrel portion of the preform have a three-layer structure, the innermost layer and the outermost layer of the three-layer structure are made from a first material, the intermediate layer is made from a second material, and the thickness (tc) of the intermediate layer of the bottom portion is smaller (tc<to) than the thickness (to) of the intermediate layer of the barrel portion.

Secondly, the above objects and advantages of the present invention are attained by a process for producing a bottomed preform for a blow molded hollow vessel, having a barrel portion and a bottom portion, each comprising an outermost layer and an innermost layer made from a first material and an intermediate layer made from a second material, by filling the first material and the second material into the cavity of an injection mold in a single molding step, wherein the single molding step consists of (i) the substep of injecting the first material, (ii) the substep of injecting the first material and the second material at the same time, and (iii) the substep of injecting the first material which are carried out continuously in this order.

DETAILED DESCRIPTION OF THE PREFERRED EMBODIMENTS

Figure 1:
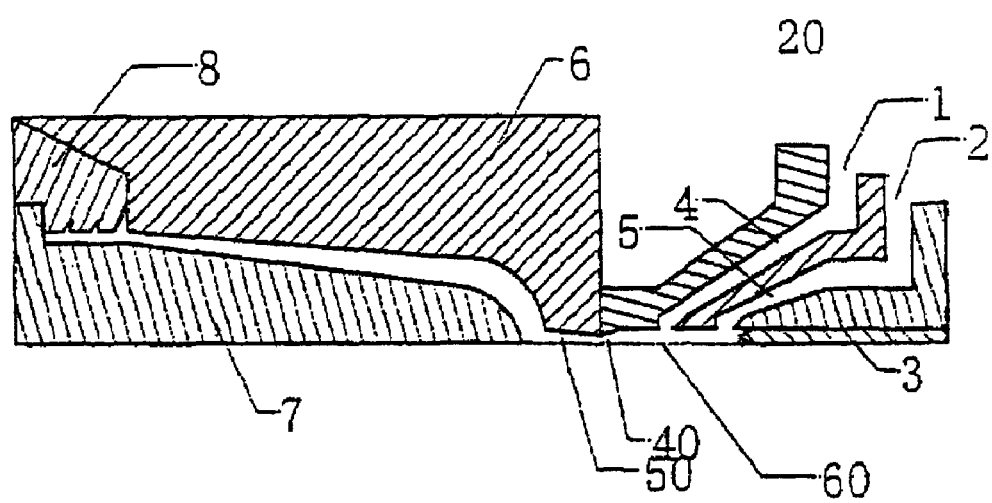
FIG. 1 is a schematic sectional view of a hot-runner system for sandwiching multiple layers and part of the cavity of a mold for a preform.

The present invention will be described in detail hereinunder.

First Material and Second Material

In the present invention, the first material and the second material are each a thermoplastic resin, preferably an aromatic polyester.

The aromatic polyester is preferably a homopolyester or copolyester which comprises terephthalic acid or naphthalenedicarboxylic acid as the main dicarboxylic acid component and ethylene glycol as the main diol component.

The aromatic polyester which comprises naphthalenedicarboxylic acid as the main dicarboxylic acid component and ethylene glycol as the main diol component comprises naphthalenedicarboxylic acid in an amount of preferably 50 to 100 mol %, more preferably 81 to 100 mol %, much more preferably 91 to 100 mol % based on the total of all the dicarboxylic acid units and ethylene glycol in an amount of preferably 50 to 100 mol %, more preferably 81 to 100 mol %, much more preferably 91 to 100 mol % based on the total of all the diol units.

The aromatic polyester which comprises terephthalic acid as the main dicarboxylic acid component and ethylene glycol as the main glycol component comprises terephthalic acid in an amount of preferably 50 to 100 mol %, more preferably 81 to 100 mol %, much more preferably 91 to 100 mol % based on the total of all the dicarboxylic acid components and ethylene glycol in an amount of preferably 50 to 100 mol %, more preferably 81 to 100 mol %, much more preferably 91 to 100 mol % based on the total of all the diol units.

Copolymerizable diol components other than ethylene glycol include aliphatic glycols such as propylene glycol, tetramethylene glycol, pentamethylene glycol, hexamethylene glycol, neopentyl glycol and diethylene glycol; alicyclic glycols such as 1,4-cyclohexane glycol; aromatic diols such as bisphenol A and alkylene oxide adduct of bisphenol A; polyols such as polyethylene glycol and polytetramethylene glycol; and fluorenes such as resorcin, hydroquinone, dihydroxydiphenyl and bishydroxyethoxyphenyl fluorene.

Copolymerizable dicarboxylic acid components other than naphthalenedicarboxylic acid and terephthalic acid include aromatic dicarboxylic acids such as isophthalic acid, t-butylphthalic acid and diphenoxyethanedicarboxylic acid; aliphatic dicarboxylic acids such as succinic acid, adipic acid and sebacic acid; and diphenyldicarboxylic acid, diphenylether dicarboxylic acid, diphenoxyethane dicarboxylic acid, phenylmethane dicarboxylic acid, diphenylketone dicarboxylic acid, diphenylsulfide dicarboxylic acid and diphenylsulfone dicarboxylic acid.

A polyester comprising naphthalenedicarboxylic acid as the main dicarboxylic acid component may comprise terephthalic acid as a copolymerizable dicarboxylic acid component besides the above compounds and a polyester comprising terephthalic acid as the main dicarboxylic acid component may comprise naphthalenedicarboxylic acid as a copolymerizable dicarboxylic acid component besides the above compounds.

The above aromatic polyester may further comprise an oxycarboxylic acid or polyfunctional compound having a functionality of 3 or more.

Examples of the copolymerizable oxycarboxylic acid component include oxybenzoic acid and hydroxydiphenylcarboxylic acid. Examples of the polyfunctional compound having a functionality of 3 or more include glycerin, trimethylpropane, pentaerythritol and trimellitic acid.

These components may be used in limits that do not impair the desired characteristic properties of the obtained aromatic polyester.

The above aromatic polyester can be obtained by employing a conventionally known general polymerization method for aromatic polyesters. For example, ethylene glycol, dimethyl naphthalenedicarboxylate and optionally a comonomer are subjected to an ester exchange reaction while methyl alcohol is distilled off, and then a polycondensation reaction is carried out under reduced pressure. Solid-phase polymerization may be further carried out to increase the intrinsic viscosity of the obtained polyethylene naphthalene dicarboxylate.

Polyethylene terephthalate and polyethylene naphthalate used in the present invention may be mixed with another thermoplastic resin in limits that do not impair the characteristic properties of the obtained polymer. A stabilizer, colorant, lubricant and filler may also be used according to purpose. bottomed preform The barrel portion and the bottom portion of the bottomed preform for a blow molded hollow vessel having a multi-layer structure of the present invention have a three-layer structure. The outermost layer and the innermost layer of the three-layer structure are made from the first material and the intermediate layer is made from the second material which differs from the first material.

The first material is preferably a polyester comprising ethylene terephthalate as the main recurring unit or a polyester comprising ethylene naphthalene dicarboxylate as the main recurring unit, particularly preferably polyethylene terephthalate or polyethylene naphthalene dicarboxylate.

The second material is preferably a recycled material which is composed of the same material as the first material. The recycled material as the second material is a material which is normally scrapped. The forming process and the processing process of the recycled material are not limited. Examples of the recycled material include surplus materials and scrapped materials produced in production processes, flake- and pellet-like recovered resin materials obtained by subjecting salvaged products to various processes such as cleaning, grinding, screening and granulation as required, regenerated resin materials produced from raw materials obtained by depolymerizing the above surplus and scrapped materials through a polymerization step again, and regenerated resin materials obtained by subjecting the above screened surplus materials and scrapped materials to a polymerization reaction again.

The biggest structural feature of the organic preform of the present invention is that the thickness (tc) of the intermediate layer of the bottom portion is smaller (tc<to) than the thickness (to) of the intermediate layer of the barrel portion.

Owing to the above structure, the mechanical strength, particularly drop impact resistance of the obtained hollow vessel itself can be made satisfactory even when a recycled material which is inferior in mechanical strength is used in the intermediate layer.

The end portion of the intermediate layer of the bottomed preform of the present invention is preferably located at a position in a direction from the bottom portion toward the barrel portion, where it is substantially not stretched when a blow molded hollow vessel is formed by blow molding the bottomed preform.

The amount of the intermediate layer is preferably 10 wt. % or more, more preferably 20 to 50 wt. % of the total amount of the bottomed preform of the present invention.

A description is subsequently given of a process for producing the preform of the present invention.

The production process of the present invention is a process for producing the preform of the present invention by filling the first material and the second material into the cavity of an injection mold in a single molding step. In the single molding step, (i) the substep of injecting the first material, (ii) the substep of injecting the first material and the second material at the same time, and (iii) the substep of injecting the first material are carried out continuously in this order.

The process of the present invention will be described with reference to an embodiment shown in the attached drawing.

FIG. 1 shows the hot runner nozzle of an injection mold and part of a cavity for the preform. The first material and the second material are supplied to a multi-tube nozzle 20 through a first material manifold 1 and a second material manifold 2, respectively. The end of the multi-tube nozzle is provided with a valve gate which can be closed by a valve pin 3. The passages of the first material and the second material are closed based on an injection sequence and it is possible to prevent the first material from flowing back into the passage of the second material. As for the structure of the multi-tube nozzle, the valve pin 3 is located at the center, the passage 5 of the second material is situated next to the valve pin 3, and the passage 4 of the first material is located at a position corresponding to the outermost layer. Reference numeral 40 denotes a gate, 50 denotes a land and 60 denotes a nozzle junction. This structure is known as a hot runner system for multi-layer sandwich molding. This structure is not particularly limited in the present invention.

A cavity consisting of three separate parts is located before the hot runner nozzle. The cavity consists of a cavity body 6, an in-core cavity 7 for making a hollow molded product and a neck ring 8 which will form the threaded mouth portion of a hollow vessel and has the same structure as an ordinary injection mold. The first material and the second material are injected from separate cylinders through the respective hot runner manifolds, merged in the hot runner nozzle and filled into the cavity. The timings of filling the first material and the second material are controlled by the injection timings of the respective cylinders.

In the process of the present invention, as described above, injection timings for carrying out the above substeps (i) to (iii) continuously in this order in the single molding step are important.

Figure 2:
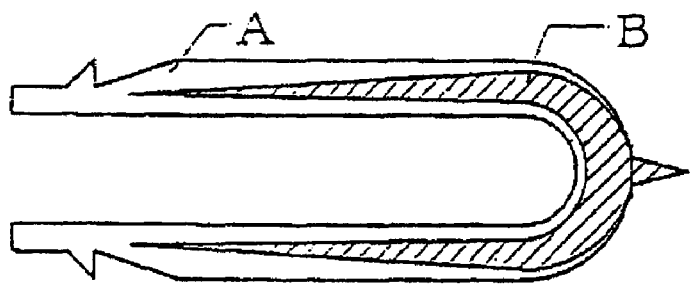
FIG. 2 is a schematic sectional view of a conventional preform having a three-layer structure obtained by injecting a first material and then a second material.
Figure 3:
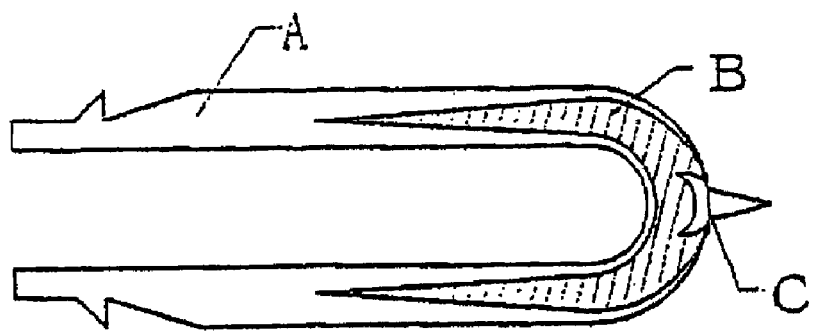
FIG. 3 is a schematic sectional view of a conventional preform having a three-layer structure obtained by injecting a first material, a second material and the first material again.
Figure 4:
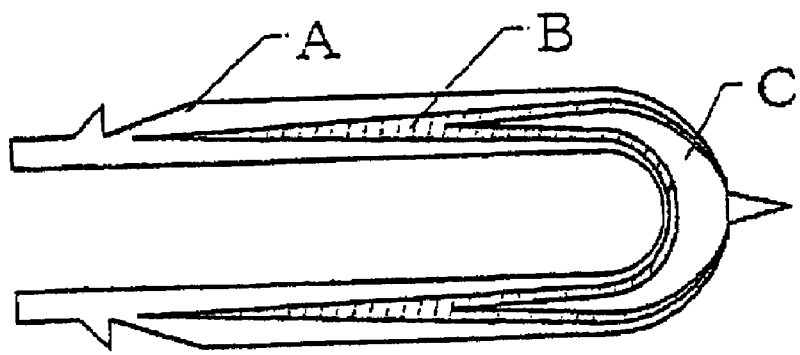
FIG. 4 is a schematic sectional view of a conventional preform having a five-layer structure from the bottom portion up to below the barrel portion of the preform by injecting a first material and then a second material and filling a predetermined amount of the first material again.

In order to explain this, an example of the prior art will be first described with reference to FIG. 2, FIG. 3 and FIG. 4.

In general, the sandwich molding of two different materials is effected by carrying out first injection for filling a first material into a cavity and then second injection for filling a second material into the cavity. When molding is carried out in this sequence, as shown in FIG. 2, an intermediate layer is formed in the molded product, thereby forming a three-layer structure made from two different materials, generally called "sandwich structure". "A" denotes a skin layer formed by the first injection and "B" denotes an intermediate layer formed from the second material by the second injection. By changing the ratio of the amount of the first injection to the amount of the second injection, the amount of the second material and the position of the end of the intermediate layer made from the second material can be changed. However, as there is correlation between the amount of injection and the position of the end of the intermediate in this case, it is difficult to control these independently. When the above molding process is used, a phenomenon that the thickness distribution of the intermediate layer is such that the thickness of the end portion of the intermediate layer is small and the thickness of a portion near the gate of the intermediate layer is the largest cannot be avoided. When a recycled material having low mechanical strength is used as the second material, the most concerned problem with the mechanical strength of a hollow vessel formed by blow molding from the viewpoint of actual use is the drop strength of the bottom portion. Since the bottom portion has a low draw ratio, even when an ordinary newly produced material is used, it is apt to be inferior in impact strength to the barrel portion which is stretched. To cope with this, the thickness of the intermediate layer made from the second material near the bottom portion must be reduced somehow. When a 1-liter bottle is molded from the recycled material by the above process, the second material which is the recycled material can be used in an amount of more than 40 wt. %. However, when a drop impact test was carried out by dropping a bottle filled with contents on a concrete floor from a height of 1.5 m, a bottle produced without using a recycled material endured the drop impact test but a bottle molded using a recycled material by the above process cracked in the bottom portion and broke by the drop impact.

When the injection step is concluded by the second injection of the second material, a trace amount of the second material remains in the junction portion of the above multi-tube hot runner nozzle and mixed with the first material used for the first injection in the subsequent injection substep. In this case, as there is a possibility that the recycled material is mixed with the first material and contacted to the contents of the hollow molded product, there may arise a problem with the sanitation of the hollow vessel. Since the nozzle and the land are filled with the second material, production problems such as gate cutting and stringing may occur.

To improve the sequence of injection, the first injection of the first material, the second injection of the second material and the third injection of the first material were carried out. This injection pattern and the layer structure of the obtained molded product are shown in FIG. 3. To reduce the thickness of the intermediate layer of the bottom portion, the end portion of the intermediate layer was extended up to the upper portion of the barrel portion, and further the first material was injected in the latter stage of the injection step to prevent the second material from remaining in the nozzle and the land. "C" denotes a penetrating layer formed by the third injection. In this case, by carrying out the third injection of the first material, the second material in the nozzle portion was replaced by the first material and the second material could be prevented from mixing with the first material in the subsequent injection substep. The amount of the second material was reduced to improve the mechanical strength of the bottom portion but the thickness of the intermediate layer of the bottom portion was not reduced so much. Meanwhile, the end portion of the intermediate layer was situated at the upper portion of the barrel portion. When the end portion of the intermediate layer is situated at a position where it is stretched at the time of blow molding, a mark is left in the end portion of the intermediate layer in the obtained blow molded hollow vessel as stretching nonuniformity which is a problem to be solved for practical use because the second material which is a recycled material and the first material which is a newly produced material differ from each other in stretching characteristics. Since the amount of the second material was reduced, this process is not suitable in obtaining a hollow vessel having excellent characteristic properties by maximizing the amount of the recycled material.

In view of the above problem, it is possible to obtain a preform having a five-layer structure including a layer which is made from the first layer and penetrates the intermediate layer by increasing the amount of third injection in the above injection pattern. By adjusting the amount of the third injection, the thickness of the intermediate layer of the bottom portion can be reduced. This injection pattern and the structure of the obtained molded product are shown in FIG. 4. When this process is used, it is observed that the thickness of the intermediate layer made from the second material in the bottom portion is efficiently reduced. However, in view of the position relationship between the actually blow molded hollow vessel and the preform, the edge of the bottom portion which receives impact the most at the time of dropping the hollow vessel is situated far below the barrel portion of the preform. Therefore, to fully reduce the thickness of the intermediate layer below the barrel portion, the end position of the penetrating layer formed by the third injection must be extended up to a portion near the center of the barrel portion of the preform. Therefore, since the amount of the third injection, namely, the amount of the first material increases, this process is not suitable in maximizing the amount of the second material which is the recycled material.

Figure 5:
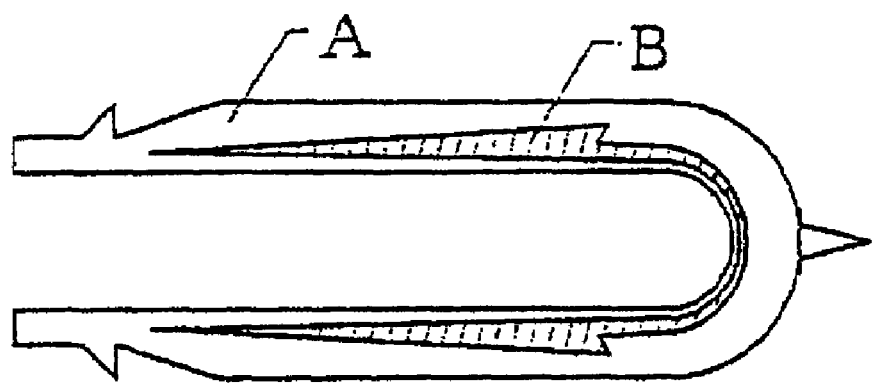
FIG. 5 is a schematic sectional view of an embodiment of a preform having a three-layer structure obtained by the process of the present invention.

A description is subsequently given of the present invention with reference to FIG. 5. According to the process of the present invention, to attain recyclability, namely, increase the amount of a recycled material and the strength of a hollow vessel, the first injection of the first material is followed by the simultaneous second injection of the first material and the second material and then the third injection of the first material alone as described above. This injection pattern and the structure of the obtained molded product are shown in FIG. 5. At this point, the amount of the first injection is preferably controlled to ensure that the position of the end of the intermediate layer made from the second material reaches a position where it is substantially not stretched, that is, the neck ring portion or therearound, in a direction from the bottom portion toward the barrel portion when the preform is blow molded into a hollow vessel. When the amount of the first injection is small, the end of the intermediate layer is situated in the barrel portion of the vessel and a streak is apt to be formed by stretching nonuniformity at that position. When the amount of the first injection is too large, the end of the intermediate layer may reach the end of the opening of the bottomed preform, whereby the second material may be exposed from the innermost layer and may contact contents to be filled in the hollow molded product. In the second injection, the first material and the second material must be injected at the same time. The first material and the second material merge in a layer form in the junction of the hot runner nozzle and are filled into the cavity. Therefore, the thickness of the intermediate layer made from the second material can be positively adjusted by changing the injection rates of these materials. In the present invention, since it is desired to increase the amount of the recycled material as much as possible, it is effective to reduce the injection rate of the first material as much as possible and increase the injection rate of the second material in the second injection. However, when the injection rate of the first material is reduced drastically, a crease-like flow mark is formed on the surface of the molded product. The injection rate ($V_1$) of the first injection and the total ($V_2$) of the injection rate ($V_{21}$) of the first material and the injection rate ($V_{22}$) of the second material in the second injection are preferably equal to each other from the viewpoint of the prevention of a flow mark. The relationship between the injection rate ($V_{21}$) of the first material and the injection rate ($V_{22}$) of the second material in the second injection preferably satisfies $0.1 < V_{21}/V_{22} < 1$. When $1 < V_{21}/V_{22}$, the amount of the second material which differs according to the shape of the preform may become 10 wt. % or less disadvantageously. In the present invention, the amount of the second material, namely, the intermediate layer is preferably 10 wt. % or more. Meanwhile, when $0.1 > V_{22}/V_{22}$, the injection of the first material decreases substantially drastically and the injection of the second material sharply increases. In the actual molding machine, there is a small time lag between the injection of the first material and the injection of the second material or a delay in the pressure propagation of a molten resin in the hot runner. When this sharp change in injection rate occurs, a flow mark is formed disadvantageously. $V_{21}/V_{22}$ is preferably larger than 0.2 and smaller than 0.5.

According to the present invention, in order to achieve mechanical strength, particularly drop impact resistance for a hollow vessel itself even when a recycled material having low mechanical strength is used, the thickness (to) of the intermediate layer made from the second material of the barrel portion of the preform must be larger (tc<to) than the thickness (tc) of the intermediate layer made from the second material of the bottom portion of the preform. As (tc) becomes larger than (to) when a preform is produced by ordinary sandwich molding as described above, a hollow vessel having excellent mechanical strength to which the present invention is directed cannot be obtained. To obtain the effect of the present invention, third injection must be carried out. The amount of this third injection which greatly differs according to the shape of the preform and the shape of a hollow vessel formed by blow molding the preform is not particularly limited. For example, the position of the end of the third injection may be adjusted to a position corresponding to the edge of the bottom portion which will receive impact the most at the time of falling. When the process of the present invention is used, as the thickness of the intermediate layer sharply decreases at the end of the third injection, the first material does not need to be filled more than required, thereby making it possible to fill the recycled material as the second material to the maximum. When a 1-liter bottle is molded by using a recycled material in accordance with the process of the present invention, the amount of the second material which is the recycled material is 28 wt. %. However, when a drop impact test is carried out by dropping the bottle filled with contents on a concrete floor from a height of 1.5 m, the bottle molded by using the recycled material in accordance with the process of the present invention endures drop impact and does not crack or break like a bottle produced without using a recycled material.

As described above, a hollow vessel made of a preform provided by the present invention is free from contact between a recycled material and contents such as foods filled in the hollow vessel even when the recycled material having low mechanical properties is used in conjunction with a newly produced material. According to the present invention, the amount of the recycled material can be increased while the mechanical strength of the hollow vessel is maintained.

The invention claimed is:

1. A process for producing a bottomed preform for a blow molded hollow vessel, having a barrel portion and a bottom portion, each comprising an outermost layer and an innermost layer made from a first material and an intermediate layer made from a second material, which process comprises filling the first material and the second material into the cavity of an injection mold in a single molding step, wherein the single molding step comprises the substep (i) of injecting the first material, the substep (ii) of injecting the first material and the second material at the same time, and the substep (iii) of injecting the first material which are carried out continuously in this order, wherein the substep (i) and the substep (ii) are carried out to satisfy the following expressions (1) and (2):

$$0.5 < V_1/V_2 < 2 \qquad (1)$$

wherein $V_1$ is the injection rate of the substep (i) and $V_2$ is the injection rate of the substep (ii), $$0.2 < V_{21} / V_{22} < 0.5 \qquad (2)$$

wherein $V_{21}$ is the injection rate of the first material and $V_{22}$ is the injection rate of the second material in the substep (ii), to form the bottomed preform for the blow molded hollow vessel having a multi-layer structure, wherein the barrel portion and the bottom portion of the preform have a three-layer structure, the innermost layer and the outermost layer of the three-layer structure are made from the first material, the intermediate layer of the structure is made from the second material, and the thickness (tc) of the intermediate layer of the bottom portion is smaller (tc<to) than the thickness (to) of the intermediate layer of the barrel portion.

2. The process of claim 1, wherein the first material and the second material are each a thermoplastic resin and the second material is essentially composed of the recovered first material.

3. The process of claim 1, wherein the first material is essentially composed of polyethylene terephthalate or polyethylene 2,6-naphthalene dicarboxylate.

4. The process of claim 1, wherein the end of the intermediate layer is located at a position in a direction from the bottom portion toward the barrel portion of the bottomed preform, where it is substantially not stretched when a hollow vessel is formed by blow molding the bottomed preform.

5. The process of claim 1, wherein the amount of the intermediate layer of the bottomed preform is 10 wt. % or more.

* * * * *